(12) United States Patent
Zhao et al.

(10) Patent No.: US 12,307,741 B2
(45) Date of Patent: May 20, 2025

(54) FULL-AUTOMATIC CLASSIFICATION METHOD FOR THREE-DIMENSIONAL POINT CLOUD AND DEEP NEURAL NETWORK MODEL

(71) Applicant: Beijing University of Civil Engineering and Architecture, Beijing (CN)

(72) Inventors: Jianghong Zhao, Beijing (CN); Xintong Dou, Beijing (CN); Yingxue Zhao, Beijing (CN); Yinrui Wang, Beijing (CN); Ruiju Zhang, Beijing (CN)

(73) Assignee: BEIJING UNIVERSITY OF CIVIL ENGINEERING AND ARCHITECTURE, Beijing (CN)

( * ) Notice: Subject to any disclaimer, the term of this patent is extended or adjusted under 35 U.S.C. 154(b) by 385 days.

(21) Appl. No.: 17/748,185

(22) Filed: May 19, 2022

(65) Prior Publication Data

US 2023/0076092 A1    Mar. 9, 2023

(30) Foreign Application Priority Data

Aug. 24, 2021  (CN) .......................... 202110973556.9

(51) Int. Cl.
| | |
|---|---|
| G06V 10/764 | (2022.01) |
| G06T 3/40 | (2006.01) |
| G06V 10/44 | (2022.01) |
| G06V 10/774 | (2022.01) |
| G06V 10/82 | (2022.01) |

(52) U.S. Cl.
CPC .............. *G06V 10/764* (2022.01); *G06T 3/40* (2013.01); *G06V 10/44* (2022.01); *G06V 10/774* (2022.01); *G06V 10/82* (2022.01); *G06T 2200/04* (2013.01)

(58) Field of Classification Search
None
See application file for complete search history.

(56) References Cited

U.S. PATENT DOCUMENTS

| | | | |
|---|---|---|---|
| 11,941,875 B2 * | 3/2024 | Chai | G06N 3/08 |
| 2022/0415059 A1 * | 12/2022 | Smolyanskiy | G06V 10/82 |
| 2023/0035475 A1 * | 2/2023 | Cheng | G01S 17/931 |

\* cited by examiner

*Primary Examiner* — Vikkram Bali
(74) *Attorney, Agent, or Firm* — McClure, Qualey & Rodack, LLP (57) ABSTRACT

A full-automatic classification method for a three-dimensional point cloud, including: acquiring a three-dimensional point cloud dataset; performing down-sampling on a three-dimensional point cloud represented by the three-dimensional point cloud dataset, selecting some points in the three-dimensional point cloud as sampling points, constructing a point cloud area group based on each sampling point, extracting a global feature of each point cloud area group, and replacing the point cloud area group where the sampling point is located with the sampling point; performing up-sampling on the three-dimensional point cloud, and performing splicing fusion on the global features of the point cloud area group where each point in the three-dimensional point cloud is located; performing category discrimination on each point in the three-dimensional point cloud; performing statistics on the number of points contained in each category, and selecting the category with the largest number of points as the category of the three-dimensional point cloud.

8 Claims, 9 Drawing Sheets

FULL-AUTOMATIC CLASSIFICATION METHOD FOR THREE-DIMENSIONAL POINT CLOUD AND DEEP NEURAL NETWORK MODEL

TECHNICAL FIELD

The present invention relates to the technical field of three-dimensional point cloud classification. More specifically, the present invention relates to a full-automatic classification method for a three-dimensional point cloud and a deep neural network model.

BACKGROUND ART

In recent years, with the rapid development of three-dimensional sensing technology, the acquisition of three-dimensional laser point clouds has become more and more convenient. A three-dimensional laser point cloud is a point set that records the surface information of a measured object, and is widely used in many fields, such as autonomous driving, three-dimensional reconstruction of cities, vegetation monitoring, etc. The classification of point clouds is a prerequisite work for the application of point cloud data. The classification of point clouds refers to classifying the point clouds into different point cloud sets, the same point cloud set has similar or the same attributes. At present, there are three point cloud classification methods: (1) point-based classification methods, such as a point signature method, a rotating image method and a voxel grid method: although this type of methods can recognize various types of targets, when the point cloud data contains noise or is partially occluded, the recognition effect is poor. (2) Methods based on machine learning: the essence of this type of methods is to perform adaptive learning and classification of features by using a model, common methods include a support vector machine and a random forest, this type of methods has a better classification effect on a model with a simple structure, but the recognition accuracy of a three-dimensional model with a complex structure is lower. (3) Point cloud classification method based on deep learning: deep learning opens up a new direction for point cloud classification, and improves the automation and intelligence of point cloud classification. The current point cloud classification method based on the deep learning technology does not need to change the data format of the point cloud, and the point cloud can be directly input into a network. The Qi team of Stanford University proposed a PointNet++ network, which obtains a global feature of the point cloud by using multi-layer perceptron (MLP) extraction, and divides the point cloud into a plurality of overlapping areas, extracts a local global feature from each area by using the multi-layer perceptron extraction to serve as a local feature of the overall point cloud, and solves the problem of point cloud disorder by using a maximum value symmetric function. However, the network ignores the same characteristics of overall semantics of the same type of point clouds and single semantics of each point, and directly uses a recognition result as a final prediction category of the point cloud without verification, such that the accuracy is lower, the robustness for the missing condition of the point cloud is general, and the influence on the accuracy by the number of sampling points of the point cloud is relatively large.

SUMMARY

One objective of the present invention is to solve at least the above-mentioned problems and to provide at least advantages which will be explained later.

Another objective of the present invention is to provide a full-automatic classification method for a three-dimensional point cloud and a deep neural network model, in which the same prior knowledge of the same overall point cloud category and the single semantic category of each point are integrated into the deep neural network, thereby improving the classification accuracy of the point cloud.

In order to achieve these objectives and other advantages according to the present invention, a full-automatic classification method for a three-dimensional point cloud is provided, including:

acquiring a three-dimensional point cloud data set;

performing down-sampling on a three-dimensional point cloud represented by the three-dimensional point cloud data set for multiple times, wherein the down-sampling process includes: selecting some points in the three-dimensional point cloud as sampling points, constructing a point cloud area group on the basis of each sampling point, extracting a global feature of each point cloud area group as a local feature of the three-dimensional point cloud, and replacing the point cloud area group where the sampling point is located with the sampling point;

performing up-sampling on the three-dimensional point cloud that has been subjected to the down-sampling processing for the same number of times as down-sampling, so as to restore the number of points in the three-dimensional point cloud to an initial number, and performing splicing fusion on the global features of the point cloud area group where each point in the three-dimensional point cloud is located during the multiple times of down-sampling, so as to obtain a fusion feature of each point;

performing, according to the fusion feature, category discrimination on each point in the three-dimensional point cloud that has been subjected to the up-sampling processing, so as to obtain category information of each point; and performing statistics on the number of points contained in each category, and selecting the category with the largest number of points as the category of the three-dimensional point cloud.

Preferably, the down-sampling process is performed twice, and the up-sampling process is also performed twice.

Preferably, the number of sampling points selected in the down-sampling process is preset, and the sampling algorithm is the farthest point sampling algorithm.

Preferably, the process of constructing the point cloud area group on the basis of each sampling point includes: taking the sampling point as a circle center, and selecting points around the sampling point according to a preset radius and a preset number of points, so as to form the point cloud area group together.

Preferably, in the up-sampling process, an interpolation method is used for restoring the number of points of the three-dimensional point cloud to the initial number.

Preferably, the full-automatic classification method for the three-dimensional point cloud is executed by a deep neural network model.

Preferably, in a training process of the deep neural network model, a loss function is used for updating model parameters by means of a gradient back-propagation algorithm, and the loss function is a negative log-likelihood loss function.

The present invention further provides a deep neural network model for automatic classification of a three-dimensional point cloud, including:

an input layer, configured to acquire a three-dimensional point cloud data set;

a point cloud down-sampling layer, configured to perform down-sampling on a three-dimensional point cloud represented by the three-dimensional point cloud data set for multiple times, wherein the down-sampling process includes: selecting some points in the three-dimensional point cloud as sampling points, constructing a point cloud area group on the basis of each sampling point, extracting a global feature of each point cloud area group as a local feature of the three-dimensional point cloud, and replacing the point cloud area group where the sampling point is located with the sampling point;

a point cloud number restoration layer, configured to perform up-sampling on the three-dimensional point cloud that has been subjected to the down-sampling processing for the same number of times as down-sampling, so as to restore the number of points in the three-dimensional point cloud to an initial number, and perform splicing fusion on the global features of the point cloud area group where each point in the three-dimensional point cloud is located during the multiple times of down-sampling, so as to obtain a fusion feature of each point;

a full-connection layer configured to, perform, according to the fusion feature, category discrimination on each point in the three-dimensional point cloud that has been subjected to the up-sampling processing, so as to obtain category information of each point; and an IRS mechanism processing unit, configured to perform statistics on the number of points contained in each category, and select the category with the largest number of points as the category of the three-dimensional point cloud.

The present invention further provides an electronic device, including: at least one processor, and a memory in communication connection with the at least one processor, wherein the memory stores instructions executable by the at least one processor, and the instructions are executed by the at least one processor, so that the at least one processor executes the above-mentioned full-automatic classification method for the three-dimensional point cloud.

The present invention further provides a storage medium on which a computer program is stored, wherein when executed by a processor, the program executes the above-mentioned full-automatic classification method for the three-dimensional point cloud.

The present invention at least includes the following beneficial effects: the present invention adds the IRS mechanism processing unit (recognition result screening unit) on the basis of classifying each point of the point cloud, and fuses the same prior knowledge of the same overall point cloud category and the single semantic category of each point in the deep neural network, thereby improving the classification accuracy of the point cloud. The classification accuracy of the deep neural network of the present invention on elements such as doors, bathtubs, cars, people and stairs can reach 100%, and the classification accuracy of common 40 elements can reach 97.28%. The present invention also strengthens the robustness of the category identification of rare point clouds, when the number of point clouds is gradually reduced from 2048 to 200, the classification accuracy of the deep neural network of the present invention on the common 40 elements is above 90%. The neural network of the present invention can still achieve a classification accuracy of 96.22% even when the number of iterations is small (only 100), which is more conducive to avoiding the occurrence of an overfitting phenomenon.

Other advantages, objectives and features of the present invention will appear in part from the following description, and in part will be appreciated by those skilled in the art from the study and practice of the present invention.

DETAILED DESCRIPTION OF THE EMBODIMENTS

The present invention will be further described in detail below with reference to the drawings, so that those skilled in the art can implement the present invention according to the description in the specification.

It should be noted that the experimental methods described in the following embodiments are conventional methods unless otherwise specified, and the reagents and materials can be obtained from commercial sources unless otherwise specified. In the description of the present invention, it should be understood that, orientation or position relationships indicated by orientation words such as "longitudinal", "transverse", "upper", "lower", "front", "back", "left", "right", "vertical", "horizontal", "top", "bottom", "inner", "outer" are orientation or position relationships shown on the basis of the drawings, and are merely for the convenience of describing the present invention and simplifying the description, rather than indicating or implying that the device or element referred to must have a particular orientation, and be constructed and operated in a particular orientation, thus cannot be construed as limiting the protection scope of the present invention.

Figure 1:
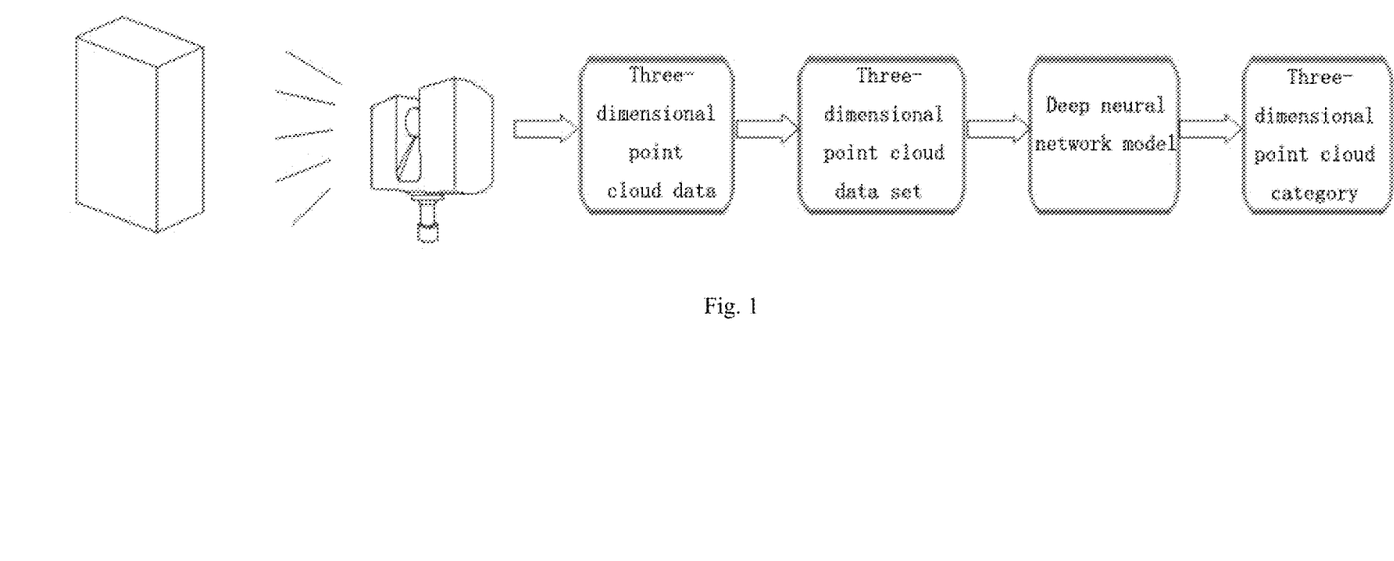
FIG. 1 is a schematic diagram of an implementation scenario of an embodiment disclosed by the present invention.

As shown in FIG. 1, it is a schematic diagram of an implementation scenario of an embodiment disclosed by the present invention. Firstly, a three-dimensional object to be processed is scanned by using a FaroFocus3D X130 scanner to obtain three-dimensional point cloud data of the three-dimensional object to be processed, registration, denoising and thinning processing are performed on the three-dimensional point cloud data of the three-dimensional object to be processed in turn to obtain a three-dimensional point cloud data set, the three-dimensional point cloud data set is input into a deep neural network model, the deep neural network model performs semantic segmentation on each point in the three-dimensional point cloud on the basis of the three-dimensional point cloud data set, performs category determination on each point, and performs secondary statistics by means of an IRS mechanism on the basis of semantic segmentation, the IRS mechanism firstly performs statistics on the number of points contained in each category in the three-dimensional point cloud, and then selects the category with the largest number of points as a final prediction tag of the overall three-dimensional point cloud.

Figure 2:
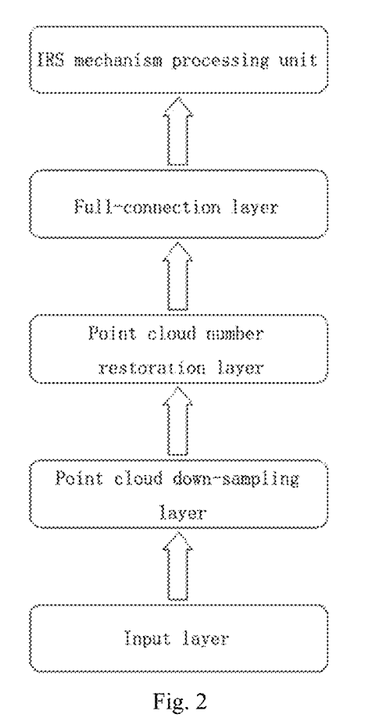
FIG. 2 is a schematic structural diagram of a deep neural network model for automatic classification of a three-dimensional point cloud according to an embodiment of the present invention.
Figure 3:
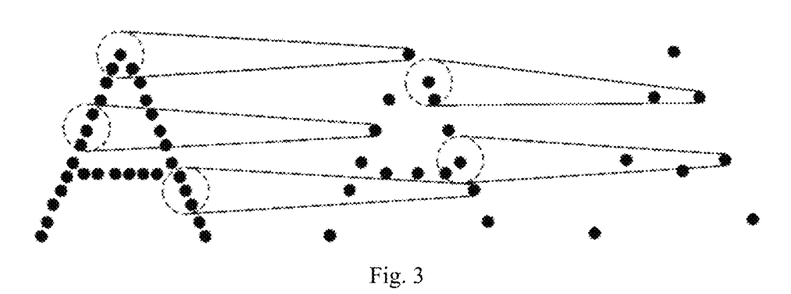
FIG. 3 is a schematic diagram of a down-sampling process according to an embodiment of the present invention.

The process of a full-automatic classification method for a three-dimensional point cloud will be described below in combination with the structure of the deep neural network model. FIG. 2 shows a schematic structural diagram of a deep neural network model for automatic classification of a three-dimensional point cloud according to an embodiment of the present invention. It should be understood that the deep neural network model can be implemented by any suitable computer program code language. As shown in FIG. 2, the deep neural network model at least includes:

an input layer, configured to acquire a three-dimensional point cloud data set;
a point cloud down-sampling layer, configured to perform down-sampling on a three-dimensional point cloud represented by the three-dimensional point cloud data set for multiple times, wherein the down-sampling process includes: selecting some points in the three-dimensional point cloud as sampling points, constructing a point cloud area group on the basis of each sampling point, extracting a global feature of each point cloud area group as a local feature of the three-dimensional point cloud, and replacing the point cloud area group where the sampling point is located with the sampling point; and
in one embodiment, the point cloud down-sampling layer includes a point cloud down-sampling unit, an area group construction unit and a global feature extraction unit. The point cloud down-sampling unit is used for sampling the three-dimensional point cloud of the input layer and only reserving some points to enter the next layer of network. Here, the point cloud down-sampling unit uses the Farthest point sampling (FPS) algorithm to select sampling points, so as to ensure that the sampling points are uniformly distributed on the entire three-dimensional point cloud. The area group construction unit is used for constructing the point cloud area group on the basis of each sampling point, and the process includes: taking the sampling point as a circle center, and selecting points around the sampling point according to a preset radius and a preset number of points, so as to form the point cloud area group together. As a feature extractor, the global feature extraction unit includes two rotation transformation layers, two convolutional layers (each convolutional layer contains three MLP layers) and a pooling layer, the global feature extraction unit is used for extracting the global feature of the point cloud, here, when the point cloud area group is constructed, the global feature extraction unit extracts the global feature of each point cloud area group as the local feature of the three-dimensional point cloud, and replaces the point cloud area group with the sampling point where the sampling point is located (as shown in FIG. 3). When performing down-sampling for multiple times, the point cloud down-sampling layer performs next down-sampling on the basis of the previous down-sampling.

Figure 4:
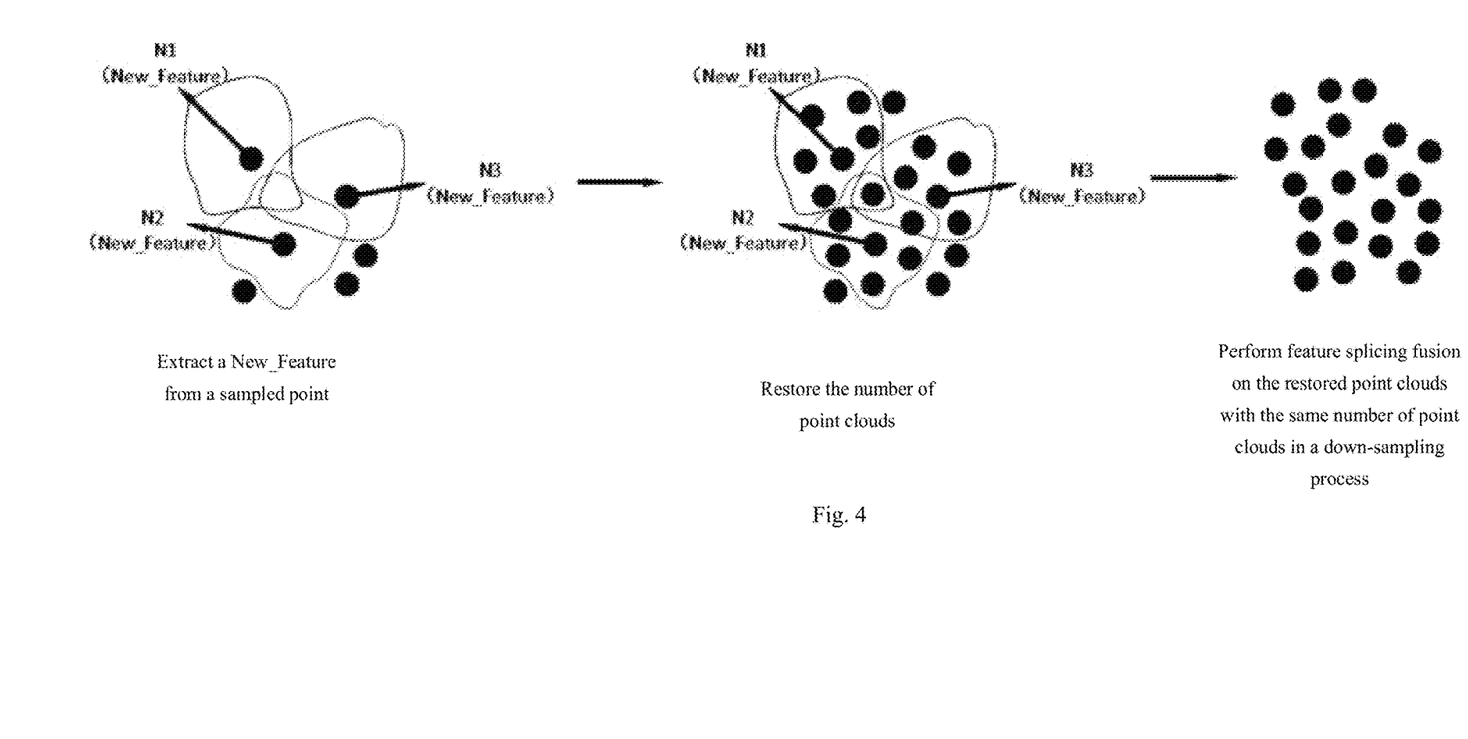
FIG. 4 is a schematic diagram of an up-sampling process according to an embodiment of the present invention.

A point cloud number restoration layer, configured to perform up-sampling on the three-dimensional point cloud that has been subjected to the down-sampling processing for the same number of times as down-sampling, so as to restore the number of points in the three-dimensional point cloud to an initial number, and perform splicing fusion on the global features of the point cloud area group where each point in the three-dimensional point cloud is located during the multiple times of down-sampling, so as to obtain a fusion feature of each point (as shown in FIG. 4); and in one embodiment, the point cloud number restoration layer includes an up-sampling unit and a feature splicing fusion unit. The up-sampling unit restores the number of points of the three-dimensional point cloud to a target number by using a neighbor relationship and position information of a known point and an unknown point and calculating a feature difference value, and the calculation formula of the feature difference value is shown in Formula 1:

$$\hat{f}_i = \frac{\sum_{j=1}^{M} \omega_j(p_i) f_j}{\sum_{j=1}^{M} \omega_j(p_i)}, \text{ among,} \quad \text{Formula (1)}$$

$$\omega_j(p_j) = \begin{cases} \frac{1}{\|p_i - p_j\|_2}, & p_j \in N(p_i) \\ 0, & \text{otherwise} \end{cases}$$

wherein ωj(pi) represents a weight, which is a reciprocal of the distance between the unknown point and the known point, represents feature difference value information of an unknown interpolation point, fj represents feature value information of the known point, and pi represents the known point. point, pj represents the unknown point, and N (pi) represents the point cloud area group where the known point is located.

The feature splicing fusion unit is used for performing splicing fusion on the global features of the point cloud area group where each point in the three-dimensional point cloud is located during the multiple times of down-sampling, so as to obtain the fusion feature of each point. The splicing fusion method herein is to directly connect the feature of each point in the three-dimensional point cloud, and then perform feature dimension transformation by means of a multi-layer perceptron (MLP).

Figure 5:
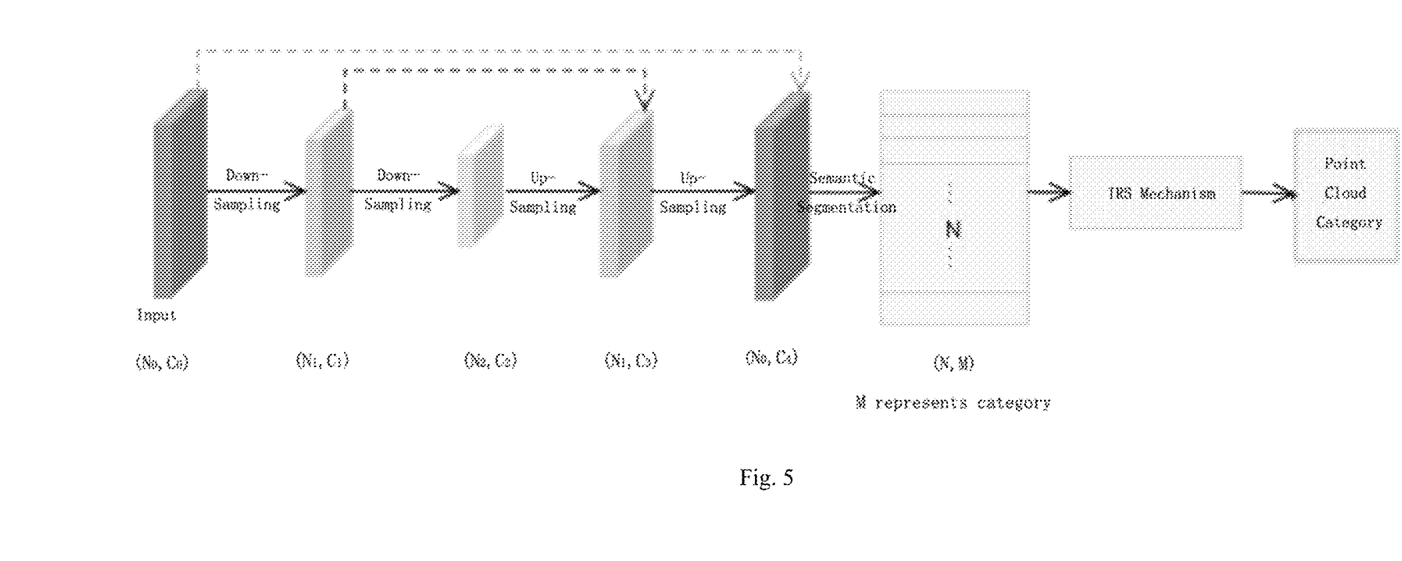
FIG. 5 is a working process diagram of a deep neural network model according to an embodiment of the present invention.

Here, the working process of the point cloud number restoration layer will be described by taking it as an example that the point cloud down-sampling layer performs twice down-sampling: assuming that the initial number of points in the three-dimensional point cloud is N, after the first time down-sampling, N1 down-sampling points are obtained, after the first time down-sampling of a point a in the three-dimensional point cloud, the global feature of the point cloud are group where the point a is located is C1, after the second time down-sampling, N2 down-sampling points are obtained, and after the second time down-sampling, the global feature of the point cloud area group where the point a is located is C2, then the point cloud number restoration layer first restores the number of points of the three-dimensional point cloud from N2 to N1, at the same time, directly connects the global feature C2 of the point cloud area group where the point a is located after the second time down-sampling to the global feature C1 of the point cloud area group where the point a is located after the first time down-sampling, that is, C1+C2, and then converts C1+C2 into C3 by means of the multi-layer perceptron (MLP), the point cloud number restoration layer restores the number of points of the three-dimensional point cloud from N1 to N, at this time, if the point a contains an initial feature C0 in the three-dimensional point cloud data set, the point cloud number restoration layer directly connects the global feature C3 of the point cloud area group where the point a is located after the twice down-sampling to the initial feature C0, that is, C0+C3, and then converts C0+C3 into C4 by means of the multi-layer perceptron (MLP), and if the point a contains no initial feature C0 in the three-dimensional point cloud data set, the point cloud number restoration layer converts C3 into C4' by means of the multi-layer perceptron (MLP) (as shown in FIG. 5).

Figure 6:
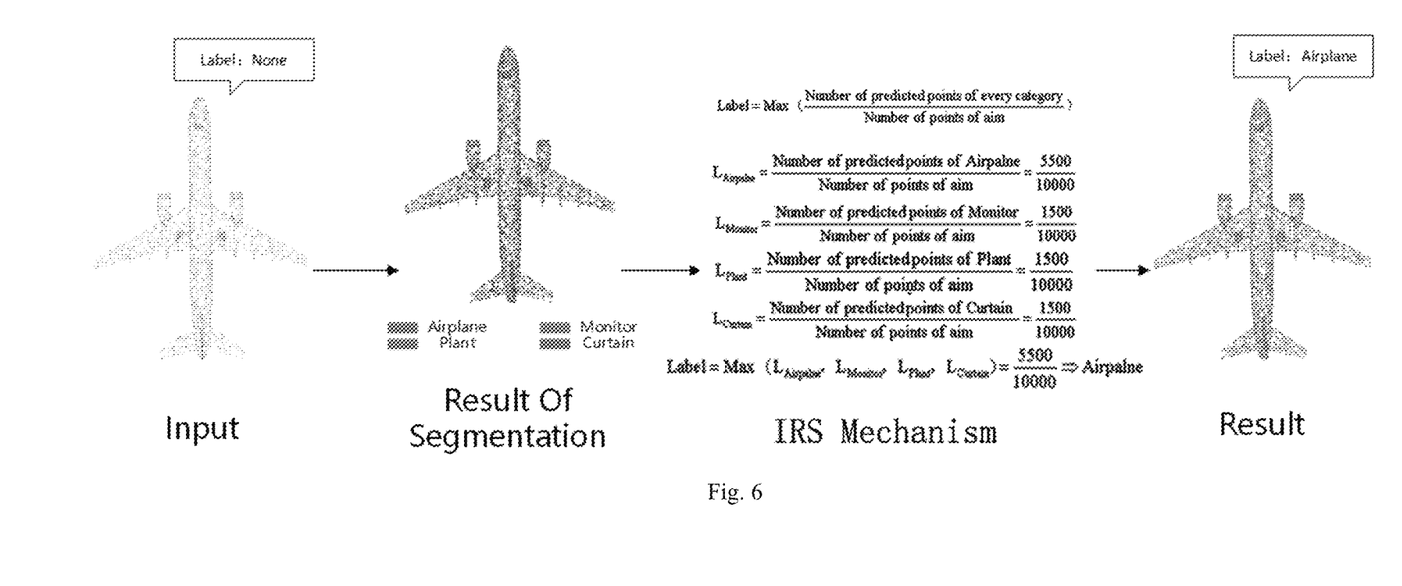
FIG. 6 is a working process diagram of an IRS mechanism processing unit according to an embodiment of the present invention.

A full-connection layer configured to, perform, according to the fusion feature, category discrimination on each point in the three-dimensional point cloud that has been subjected to the up-sampling processing, so as to obtain category information of each point; and an IRS mechanism processing unit, configured to perform statistics on the number of points contained in each category, and select the category with the largest number of points as the category of the three-dimensional point cloud. For example, a point cloud of the same category contains 10,000 points in total, semantic segmentation has been completed, and by means of the statistical function of the IRS mechanism, the statistical results are as follows: 5500 points in the point cloud are determined to be airplanes, 1500 points are determined to be plants, 1500 points are determined to be displays and 1500 points are determined to be curtains. By means of the secondary screening of the IRS mechanism, the category with the large number of points is selected as the final category of the three-dimensional point cloud, and finally the point cloud is predicted and determined to be an aircraft (as shown in FIG. 6).

In one embodiment, in a training process of the above deep neural network model, a loss function is used for updating model parameters by means of a gradient back-propagation algorithm, the loss function is a negative log-likelihood loss function, a log probability matrix and a target tag are input into the negative log-likelihood loss function, since the output value of the network is not in a matrix form, it is necessary to add a softmax layer (Formula 2) and a logarithmic processing layer (Formula 3) in front of the negative log likelihood loss function to obtain the probability matrix, and then a loss value is obtained by the negative log-likelihood loss function (Formula 4). The formula is as follows:

$$x_i = \frac{\exp(x_i)}{\sum_{i=1}^{j}\exp(x_i)} \quad \text{Formula (2)}$$

wherein exp(xi) represents e (xi), and the denominator represents the summation operation of all values by means of logarithmic processing, which realizes the normalization of the probability matrix.

$$xi = \log(xi) \quad \text{Formula (3)}$$

$$NLLloss = -\sum_{n=1}^{N} y_n \log prob(x_n) \quad \text{Formula (4)}$$

wherein $x_n$ represents the predicted probability matrix, and $y_n$ represents a tag value of data, which is the probability matrix of the same dimension as $x_n$.

Looking back at the structure and processing process of the above deep neural network model, it can be seen that the IRS mechanism processing unit (recognition result screening unit) integrates the same prior knowledge of the same overall point cloud category and the single semantic category of each point into the deep neural network, thereby improving the classification accuracy of the point cloud.

Figure 7:
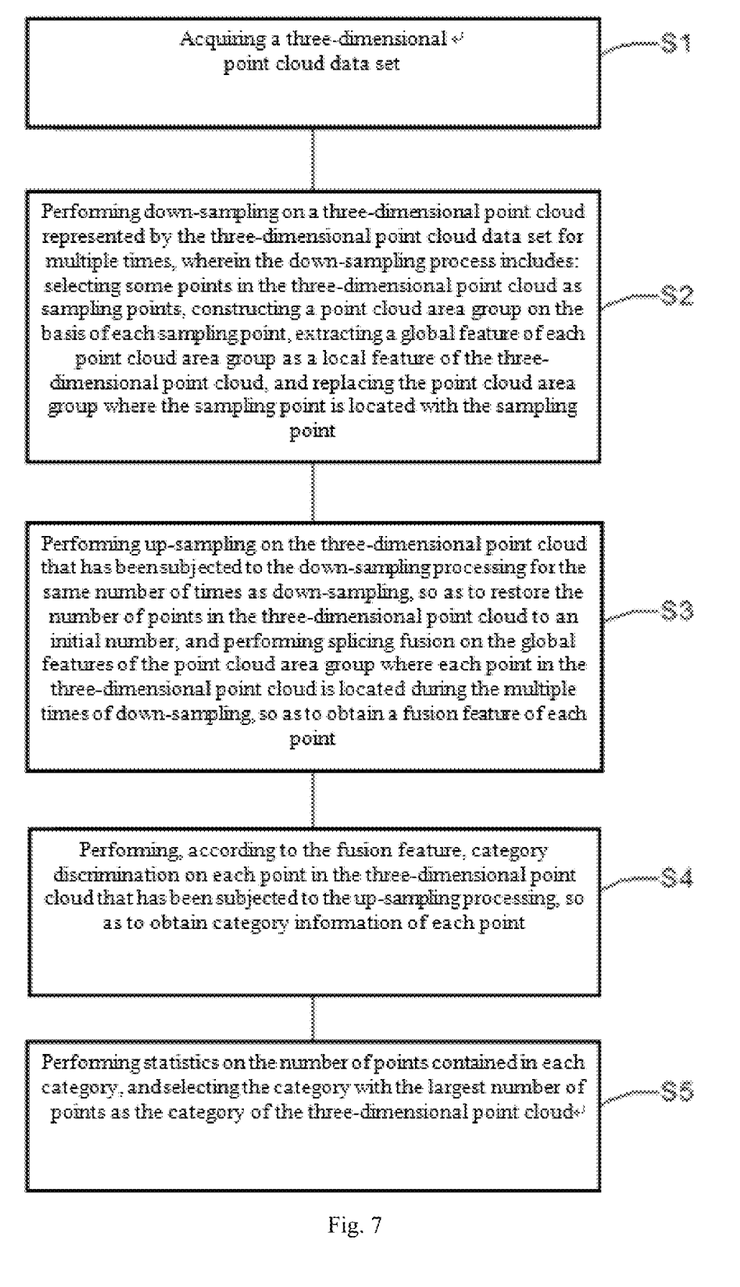
FIG. 7 is a flow diagram of a full-automatic classification method for a three-dimensional point cloud according to an embodiment of the present invention.

On the other aspect, the present invention further provides a full-automatic classification method for a three-dimensional point cloud. FIG. 7 is a flow diagram of a full-automatic classification method for a three-dimensional point cloud according to an embodiment of the present invention. The method can be executed by any apparatus, device, platform, or device cluster with computing and processing capabilities. As shown in FIG. 7, the method includes the following steps:

S1, acquiring a three-dimensional point cloud data set; specifically, the three-dimensional point cloud data set at least includes coordinate information of each point;

S2, performing down-sampling on a three-dimensional point cloud represented by the three-dimensional point cloud data set for multiple times, wherein the down-sampling process includes: selecting some points in the three-dimensional point cloud as sampling points, constructing a point cloud area group on the basis of each sampling point, extracting a global feature of each point cloud area group as a local feature of the three-dimensional point cloud, and replacing the point cloud area group where the sampling point is located with the sampling point; and specifically, the down-sampling process can be performed twice, the number of sampling points selected in the down-sampling process is preset, and the sampling algorithm is the Farthest point sampling algorithm, and when the down-sampling process is performed for multiple times, the next down-sampling is performed on the basis of the previous down-sampling. The process of constructing the point cloud area group on the basis of each sampling point includes: taking the sampling point as a circle center, and selecting points around the sampling point according to a preset radius and a preset number of points, so as to form the point cloud area group together.

S3, performing up-sampling on the three-dimensional point cloud that has been subjected to the down-sampling processing for the same number of times as down-sampling, so as to restore the number of points in the three-dimensional point cloud to an initial number, and performing splicing fusion on the global features of the point cloud area group where each point in the three-dimensional point cloud is located during the multiple times of down-sampling, so as to obtain a fusion feature of each point; and specifically, the up-sampling process can be performed twice. In the up-sampling process, the number of points of the three-dimensional point cloud is restored to the initial by using an interpolation method, the number of points of the three-dimensional point cloud is restored to a target value by using a neighbor relationship and position information of a known point and an unknown point and calculating a feature difference value, and the calculation formula of the feature difference value is shown in Formula 1. The splicing fusion method is to directly connect the feature of each point in the three-dimensional point cloud, and then perform feature dimension transformation by means of a multi-layer perceptron (MLP).

S4, performing, according to the fusion feature, category discrimination on each point in the three-dimensional point cloud that has been subjected to the up-sampling processing, so as to obtain category information of each point; and S5, performing statistics on the number of points contained in each category, and selecting the category with the largest number of points as the category of the three-dimensional point cloud.

When the above-mentioned full-automatic classification method for the three-dimensional point cloud is executed by using a deep neural network model, in a training process of the deep neural network model, a loss function is used for updating model parameters by means of a gradient back-propagation algorithm, and the loss function is a negative log-likelihood loss function.

In the following description, the deep neural network model provided by the present invention is taken as an embodiment and a PointNet++ model is taken as a comparative example, and comparative experiments for different purposes are carried out in a ModelNet40 public data set.

The experiments carried out by the present invention is performed in Pycharm under a Win10 system, and the specific environment parameters are: Python 3.7, CUDA 10.1, CuDnn 7.6.5, PyTorch 1.7.1.

The data set used in the experiment of the present invention is the ModelNet40 public data set, which collects 40 different categories of three-dimensional object data, and contains 12,311 samples in total, including 9843 training samples and 2468 test samples. For experimental comparison, the same data preprocessing method is utilized for the experiment of the embodiment of the present invention and the comparative example (PointNet++), and only three-dimensional coordinates of the data are used as input features.

In a classification experiment performed by the present invention, hyperparameter settings of the network model of the embodiment are as follows: the batch size (Batch) is set to be 8, the parameter is a data size input into the network at the same time, which affects the convergence speed of the network model and depends on the performance of computer GPU, and by means of a pre-experiment, the Batch is set to be 8 herein; gradient descent is implemented by using a cross-entropy loss function to update network model parameters; in order to quickly find an optimal solution, an Adam optimizer is used; a learning rate (Learning Rate, lr) is the magnitude of the network for updating parameters, and is set to be 0.001; and a learning rate decay rate is set to be 0.7.

(1). Model Accuracy Comparison

In the present embodiment, the accuracy of the deep neural network of the present invention is verified at first by using a variable control method, the number of iterations (Epoch) is set to be 251, the number of sampling points (Npoints) is set to be 2048, and the experimental comparison of the embodiment and the comparative example is performed under the same conditions. A comparison diagram of accuracy in the training process is shown in FIG. 8.

Figure 8:
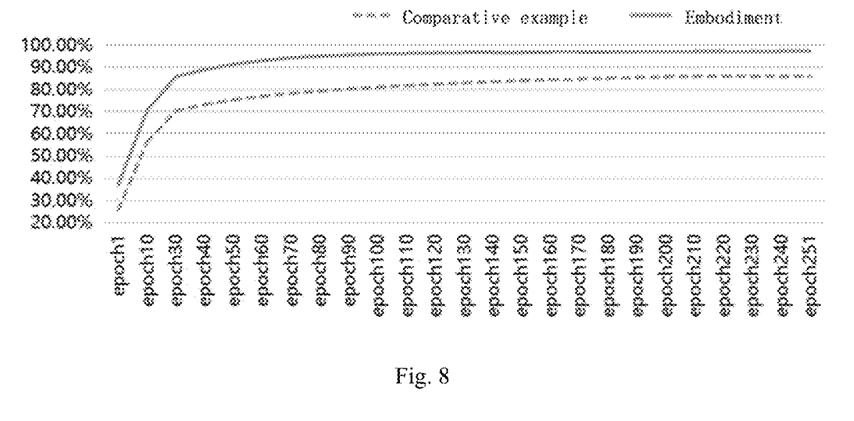
FIG. 8 is a comparison diagram of accuracy results of an embodiment and a comparative example in the present invention.

FIG. 8 illustrates that under the same training conditions (equal number of iterations and equal sampling points), the training accuracy of the embodiment of the present invention is always higher than that of the comparative example. The final specific training accuracy of the two and the training accuracy of each single category are shown in Table 1.

TABLE 1

Comparison of the accuracy of the embodiment and the comparative example under 2048 sampling points and the accuracy of each category (Acc/%)

| Category | Whole | Mean | Optimum | Airplane | Bathtub | Bed | Bench | Book-shelf |
|---|---|---|---|---|---|---|---|---|
| Comparative Example | 85.94 | 86.30 | 90.21 | 99.68 | 91.51 | 97.67 | 87.86 | 94.58 |
| Embodiment | 97.28 | 96.35 | 97.45 | 99.84 | 100.0 | 99.71 | 98.55 | 97.55 |

Continuation table

| Bottle | Bowl | Car | Chair | Cone | Cup | Curtain | Desk | Door | Dresser |
|---|---|---|---|---|---|---|---|---|---|
| 94.33 | 90.63 | 98.89 | 99.33 | 95.81 | 77.22 | 81.16 | 89.50 | 83.49 | 83.50 |
| 98.66 | 96.88 | 100.0 | 99.55 | 98.80 | 92.41 | 99.28 | 98.25 | 100.0 | 93.25 |

Continuation table

| Flower_pot | Glass_box | Guitar | Keyboard | Lamp | Laptop | Mantel | Monitor |
|---|---|---|---|---|---|---|---|
| 32.21 | 84.21 | 98.71 | 99.31 | 91.13 | 97.99 | 94.37 | 98.06 |
| 41.61 | 96.77 | 99.03 | 98.62 | 99.19 | 99.66 | 97.36 | 99.68 |

TABLE 1-continued

Comparison of the accuracy of the embodiment and the comparative example
under 2048 sampling points and the accuracy of each category (Acc/%)

Continuation table

| Night_stand | Person | Piano | Plant | Radio | Range_hood | Sink | Sofa | Stairs |
|---|---|---|---|---|---|---|---|---|
| 76.50 | 92.05 | 93.94 | 90.00 | 60.58 | 98.26 | 92.97 | 99.12 | 93.55 |
| 88.72 | 100.0 | 98.70 | 95.21 | 95.67 | 99.13 | 98.44 | 99.85 | 100.0 |

Continuation table

| Stool | X-box | Table | Tent | Toilet | Tv_stand | Vase | Wardrobe |
|---|---|---|---|---|---|---|---|
| 85.56 | 75.73 | 90.82 | 92.64 | 98.55 | 78.28 | 89.05 | 55.17 |
| 95.00 | 96.60 | 96.81 | 99.08 | 99.85 | 93.07 | 96.53 | 96.53 |

It can be seen from Table 1 that, the final overall accuracy in the embodiment of the present invention reaches 97.28%, which is increased by 11.34% compared with that of the comparative example; the average accuracy of each category reaches 96.35%, which is increased by 10.05% compared with that of the comparative example; the optimal accuracy reaches 97.45, which is increased by 7.24% compared with that of the comparative example; and the accuracy of each category is higher than the accuracy of the comparison ratio, for example, the recognition accuracy of the embodiment of the present invention for items such as a bathtub (Bathtub), a car (Car), a door (Door), a person (Person), and stairs (Stairs) can reach a classification effect of 100%.

(2) Model Robustness Verification

Figure 9:
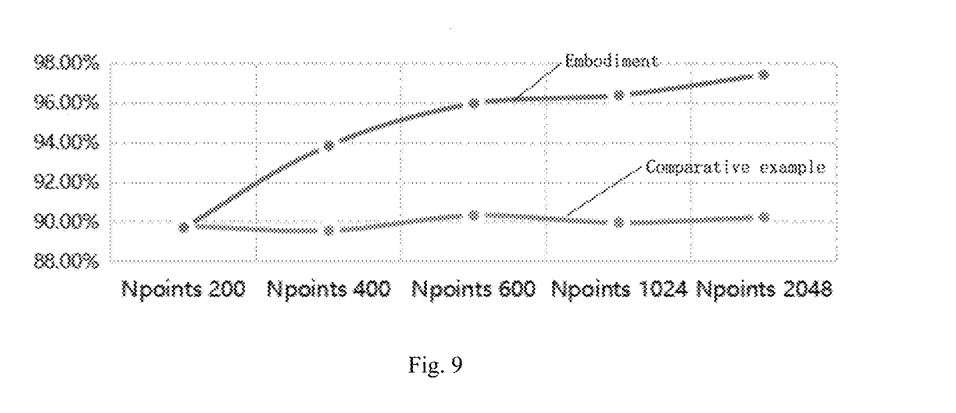
FIG. 9 is a comparison diagram of robustness of an embodiment and a comparative example in the case of different sampling points in the present invention.

In order to verify the robustness of the embodiment of the present invention, a robustness comparative experiment between the embodiment and the comparative example is carried out in the present embodiment. The variable control method is utilized in the comparative experiment, and the the robustness of the two networks is compared by setting different numbers of sampling points (Npoints) and keeping other experimental conditions consistent. In the present embodiment, the number of sampling points is set to be 200, 400, 600, 1024 and 2048 respectively, and the number of iterations is set to be 251, and the optimal accuracy of the embodiment and the comparative network model of each group of comparative experiments is shown in FIG. 9. It can be observed from FIG. 9 that, when the number of sampling points of the point cloud is reduced from 2048 to 200, the accuracy of the embodiment is higher than that of the comparative example, and it still has a high accuracy for the case where the number of point clouds is sparse, thus showing better robustness.

Figure 10:
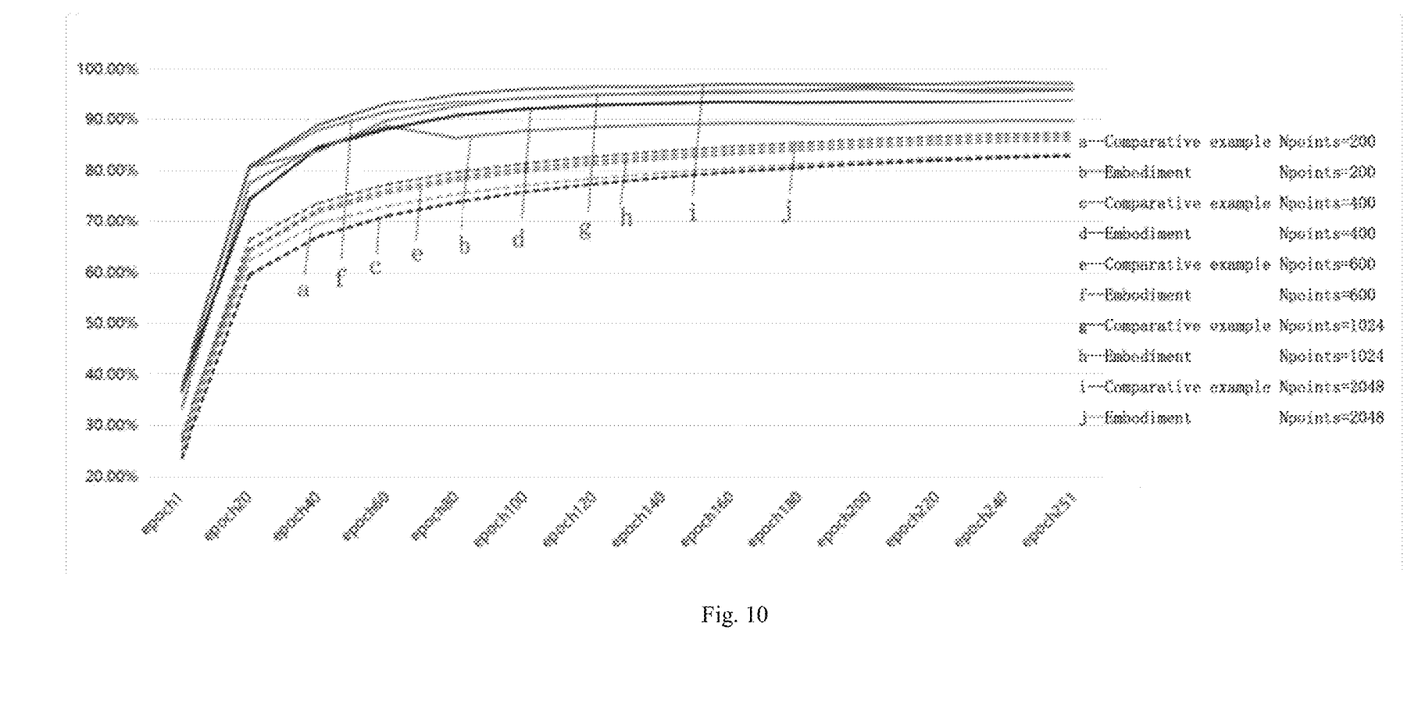
FIG. 10 is a comparison diagram of a training process of an embodiment and a comparative example in the case of different sampling points in the present invention.

In the present embodiment, the training processes of five groups of comparative experiments are also compared, and the results are shown in FIG. 10. It can be seen from FIG. 10 that, when the number of sampling points of the point cloud in each group of comparative experiments is the same, the training accuracy of the embodiment is always better than that of the comparative example; and even when the number of sampling points of the point cloud is reduced to a minimum value of 200, the accuracy change process of the embodiment is still better than that of the comparative example when the number of sampling points is 2048. Therefore, even though the number of points in the point cloud is very rare, the embodiment still shows higher accuracy, which indicates that the embodiment of the present invention has stronger robustness.

(3) Comparison of Model Training Iterations

The number of iterations is an important hyperparameter in deep learning, and the important hyperparameter affects the accuracy and mobility of the model. If the number of iterations is set to be too low, the training accuracy of the network model will be lower; and if the number of iterations is set to be too high, although the training accuracy is improved, the test accuracy and mobility ability will be reduced, resulting in an overfitting phenomenon. Therefore, it is necessary to find the optimal number of iterations of the network model, which can not only optimize the network accuracy, but can also avoid the overfitting phenomenon.

Figure 11:
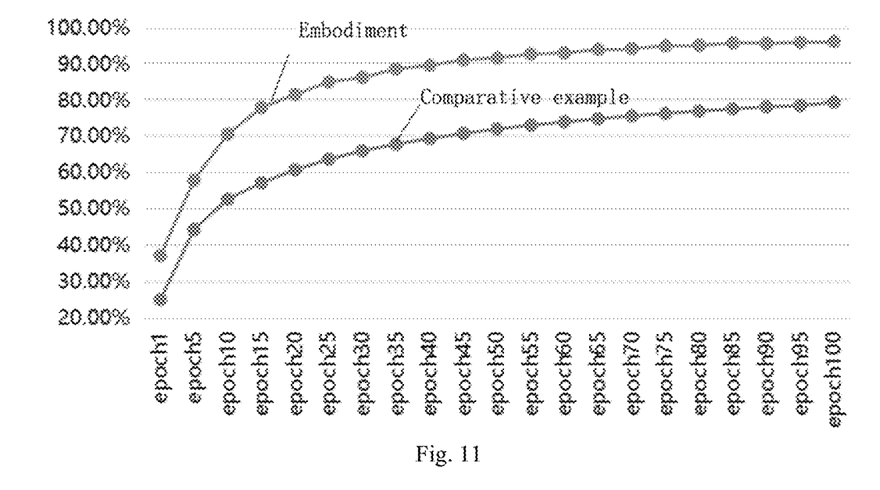
FIG. 11 is a comparison diagram of variation of accuracy results of an embodiment and a comparative example in the case of the number of iterations of 100 in the present invention.

In order to study the influence of the number of iterations on the network accuracy of the embodiment of the present invention, in the present embodiment, the number of sampling points (Npoints) is set to be 2048 and the number of iterations (Epoch) is set to be 100 to perform the training of the embodiment and the comparative example. The variations in the training accuracy of the two networks are shown in FIG. 11:

It can be seen from FIG. 11 that, with the increase in the number of iterations, the overall accuracy (Accuracy) of the network models of the embodiment and the comparative example shows a continuous increasing trend. The overall recognition accuracy when Epoch=100 is 79.43% and 96.22%, respectively. The accuracy improvement speed of the embodiment of the present invention is higher than that of the comparative example:

The results indicate that, compared with the comparative example, the embodiment of the present invention achieves higher classification accuracy through fewer iterations, which indicates that the network model of the embodiment of the present invention is less prone to overfitting under the condition of ensuring the accuracy, thus having better mobility.

In the present embodiment, a point cloud category prediction test is performed on the trained network, and the test results are as follows:

TABLE 2

Comparison of recognition results between a figure and a bookshelf

| data | network | Label | Pred |
|---|---|---|---|
| [figure of person] | embodiment | figure | figure |
| [figure of bookcase] | embodiment | bookshelf | bookshelf |

The present invention further provides an electronic device, including: at least one processor, and a memory in communication connection with the at least one processor, wherein the memory stores instructions executable by the at least one processor, and the instructions are executed by the at least one processor, so that the at least one processor executes the above-mentioned full-automatic classification method for the three-dimensional point cloud.

The present invention further provides a storage medium on which a computer program is stored, wherein when executed by a processor, the program executes the above-mentioned full-automatic classification method for the three-dimensional point cloud.

Although the embodiments of the present invention have been disclosed as above, it is not limited to the applications listed in the description and the embodiments, and it can be completely applied to various fields suitable for the present invention. For those skilled in the art, additional modifications can be realized easily. Therefore, the present invention is not limited to the specific details and illustrations shown and described herein without departing from the general concept defined by the appended claims and the scope of equivalents.

What is claimed is:

1. A full-automatic classification method for a three-dimensional point cloud, comprising:
    acquiring a three-dimensional point cloud data set of a surface of a three-dimensional object;
    performing down-sampling on a three-dimensional point cloud represented by the three-dimensional point cloud data set for multiple times, wherein the down-sampling process comprises: selecting some points in the three-dimensional point cloud as sampling points, constructing a point cloud area group on the basis of each sampling point, extracting a global feature of each point cloud area group as a local feature of the three-dimensional point cloud, and replacing the point cloud area group where the sampling point is located with the sampling point;
    performing up-sampling on the three-dimensional point cloud that has been subjected to the down-sampling processing for an equal number of times as down-sampling, so as to restore the number of points in the three-dimensional point cloud to an initial number, and performing splicing fusion on the global features of the point cloud area group where each point in the three-dimensional point cloud is located during the multiple times of down-sampling, so as to obtain a fusion feature of each point;
    performing, according to the fusion feature, category discrimination on each point in the three-dimensional point cloud that has been subjected to the up-sampling processing, so as to obtain category information of each point; and
    performing statistics on a number of points contained in each category, and selecting the category with a largest number of points as the category of the three-dimensional point cloud;
    wherein the full-automatic classification method for the three-dimensional point cloud is executed by a deep neural network model;
    wherein in a training process of the deep neural network model, a loss function is used for updating model parameters by means of a gradient back-propagation algorithm, and the loss function is a negative log-likelihood loss function.

2. The full-automatic classification method for the three-dimensional point cloud according to claim 1, wherein the down-sampling process is performed twice, and the up-sampling process is also performed twice.

3. The full-automatic classification method for the three-dimensional point cloud according to claim 1, wherein a number of sampling points selected in the down-sampling process is preset, and a sampling algorithm is Farthest point sampling algorithm.

4. The full-automatic classification method for the three-dimensional point cloud according to claim 1, wherein the process of constructing the point cloud area group on a basis of each sampling point comprises: taking the sampling point as a circle center, and selecting points around the sampling point according to a preset radius and a preset number of points, so as to form the point cloud area group together.

5. The full-automatic classification method for the three-dimensional point cloud according to claim 1, wherein in the up-sampling process, an interpolation method is used for restoring a number of points of the three-dimensional point cloud to an initial number.

6. An electronic device, comprising: at least one processor, and a memory in communication connection with the at least one processor, wherein the memory stores instructions executable by the at least one processor, and the instructions are executed by the at least one processor, so that the at least one processor executes the method according to claim 1.

7. A non-transitory computer-readable medium on which a computer program is stored, wherein when executed by a processor, the program executes the method according to claim 1.

8. A deep neural network model for automatic classification of a three-dimensional point cloud, comprising:
    an input layer, configured to acquire a three-dimensional point cloud data set of a surface of a three-dimensional object;
    a point cloud down-sampling layer, configured to perform down-sampling on a three-dimensional point cloud represented by the three-dimensional point cloud data set for multiple times, wherein the down-sampling process includes: selecting some points in the three-dimensional point cloud as sampling points, constructing a point cloud area group on the basis of each sampling point, extracting a global feature of each point cloud area group as a local feature of the three-dimensional point cloud, and replacing the point cloud area group where the sampling point is located with the sampling point;
    a point cloud number restoration layer, configured to perform up-sampling on the three-dimensional point cloud that has been subjected to the down-sampling processing for the same number of times as down-sampling, so as to restore the number of points in the three-dimensional point cloud to an initial number, and perform splicing fusion on the global features of the point cloud area group where each point in the three-dimensional point cloud is located during the multiple times of down-sampling, so as to obtain a fusion feature of each point;
    a full-connection layer configured to, perform, according to the fusion feature, category discrimination on each point in the three-dimensional point cloud that has been subjected to the up-sampling processing, so as to obtain category information of each point; and
    an IRS mechanism processing unit, configured to perform statistics on the number of points contained in each category, and select the category with the largest number of points as the category of the three-dimensional point cloud;

wherein the full-automatic classification method for the three-dimensional point cloud is executed by a deep neural network model;

wherein in a training process of the deep neural network model, a loss function is used for updating model parameters by means of a gradient back-propagation algorithm, and the loss function is a negative log-likelihood loss function.

\* \* \* \* \*